United States Patent [19]
Gray

[11] 3,794,411
[45] Feb. 26, 1974

[54] MOTOR VEHICLE REAR VIEWING SYSTEM

[75] Inventor: Ronald G. Gray, Westcliff-On-Sea, England

[73] Assignee: Ford Motor Company, Dearborn, Mich.

[22] Filed: Mar. 26, 1973

[21] Appl. No.: 345,030

[52] U.S. Cl. .................. 350/302, 350/204, 350/286, 350/213, 350/307
[51] Int. Cl. ............................................. G02b 5/08
[58] Field of Search ....................... 350/48–53, 204, 350/211, 286, 287, 301–304, 307, 213

[56] References Cited
UNITED STATES PATENTS
2,963,936   12/1960   Court .................................. 350/286

2,162,160   6/1939   Cooleg ............................... 350/287

FOREIGN PATENTS OR APPLICATIONS
1,082,371   9/1967   Great Britain ..................... 350/307

Primary Examiner—Ronald L. Wibert
Assistant Examiner—Michael J. Tokar
Attorney, Agent, or Firm—John J. Roethel; Keith L. Zerschling

[57] ABSTRACT

A rear viewing system in which light is deflected onto a mirror by a prism, the prism being divided into vertical strips each with a slightly different horizontal angle to expand the field of view.

4 Claims, 4 Drawing Figures

PATENTED FEB 26 1974  3,794,411

MOTOR VEHICLE REAR VIEWING SYSTEM

BACKGROUND OF THE INVENTION

This invention relates to a rear viewing system for a motor vehicle.

Proposed legislation setting strict requirements for the field of view which must be available to the driver of the motor vehicle through the rear viewing system of the motor vehicle are proving impossible to meet with conventional single mirror systems. One possible solution to this problem has been put forward in our co-pending U.S. application Ser. No. 295,614 filed Oct. 6, 1972 for "Vehicle Interior Rear View Mirror." In this co-pending application a mirror is described which is divided into narrow vertical strips each set at a very small angle to the adjacent strip. This mirror provides an increased and adequate field of view without causing focusing problems for the driver as is the case when a convex mirror is used and at the same time the mirror does not become excessively large.

The mirror described in our co-pending application, however, does not overcome the problem of obstruction of the rear field of view by the roof supporting pillars and body work of the vehicle.

SUMMARY OF THE INVENTION

According to the invention a rear viewing system for a motor vehicle has the following features:

a. a prism is arranged to deflect light from objects to the rear of a vehicle through an aperture in the vehicle roof onto a mirror positioned in front of a driver of the vehicle;

b. the prism extends transversely of the vehicle and has vertical strips;

c. the front and rear faces of an inner vertical strip are substantially parallel in a horizontal plane;

d. the horizontal angles between the front and rear faces of the strips increase incrementally for each strip compared to the previous strip going outwardly from the inner strip; and e. each strip has its thicker side towards the inner strip so that the images formed by the different vertical strips of the prism are more closely spaced than the corresponding portions of the object thereby increasing the horizontal field of view for a given size of prism.

Preferably each vertical strip of the prism is divided into similar portions each having the same vertical angle, the same horizontal angle and substantially the same thickness. This construction reduces the thickness at the base of the prism and thereby reduces the weight and cost of the prism.

It will be appreciated that the prism may be mounted in the vehicle at a small angle to the vertical so that the angle of incidence and the angle of refraction of the light rays passing through the prism are approximately equal. Even so it has been found convenient to identify the various angles of the faces of the prism as if the prism were mounted vertically with its apex uppermost.

BRIEF DESCRIPTION OF THE DRAWINGS

The invention will now be described with reference to the accompanying drawings, in which.

DESCRIPTION OF THE PREFERRED EMBODIMENT

Figure 1:
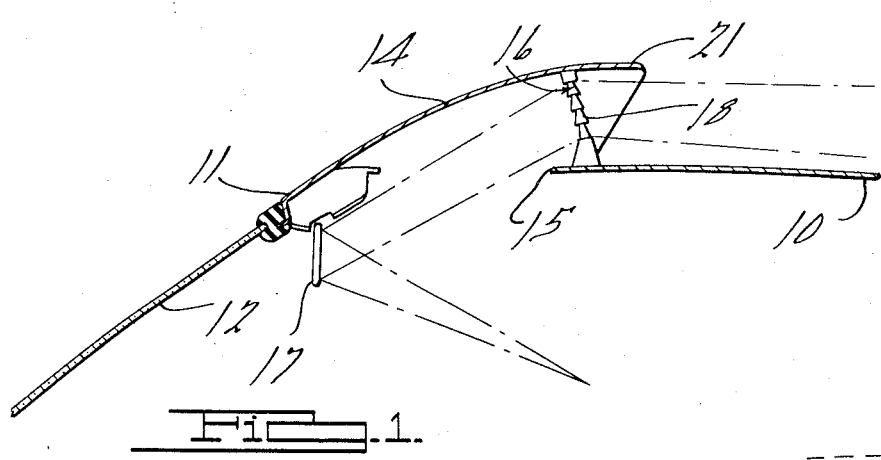
FIG. 1 is a part sectional view of a motor vehicle having a rear viewing system embodying the invention.
Figure 2:
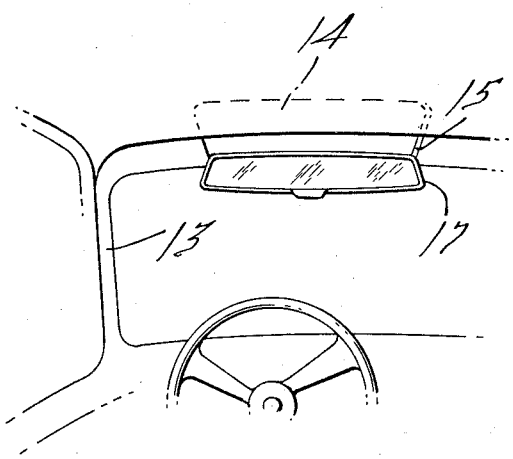
FIG. 2 is a perspective view from the drivers viewing position of the rear viewing system of FIG. 1.

A motor vehicle includes a roof 10, a header bar 11, a windshield 12 and windshield pillars 13. A housing 14 mounted over an aperture 15 in the forward portion of the roof 10 is open towards the rear of the vehicle. A prism 16 mounted in the housing 14 and extending transversely of the vehicle deflects light rays from objects to the rear of the vehicle through the opening 15 and onto a plane mirror 17 mounted on the header bar 11 at a convenient location within the field of view of the driver of the vehicle. The mirror 17 may be a day and night mirror of the kind described in our co-pending application U.S. Ser. No. 298,896 filed Oct. 19, 1972 for "Motor Vehicle Rear View Mirror."

Figure 3:
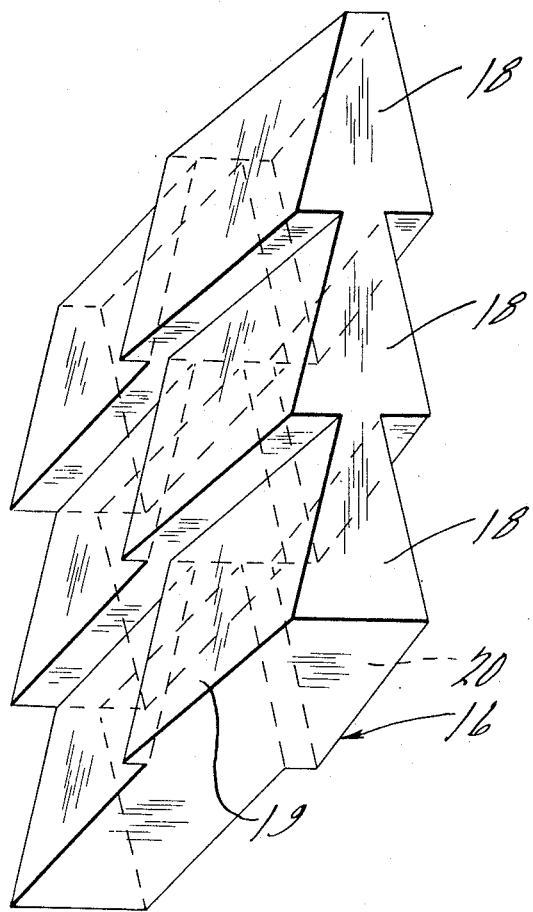
FIG. 3 is a fragmentary perspective view of the lower right-hand corner of the prism viewed from a position to the right-hand side, from the rear, and from below the prism.
Figure 4:
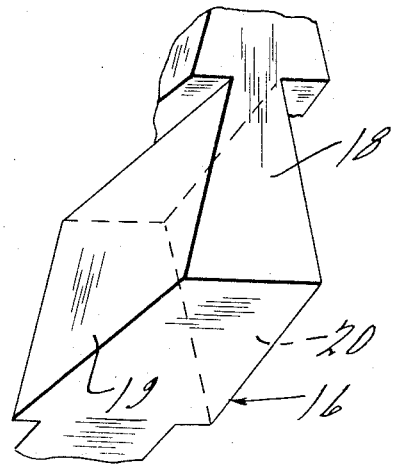
FIG. 4 is a similar view of FIG. 3 showing only a single element of the prism.

The prism 16 is formed of a large number of elements 18 arranged in vertical strips and horizontal rows. FIG. 3 shows the lower right-hand corner of the prism. By way of illustration, the prism may be 18 inches long and 4 inches high with each element approximately 5 millimeters high and 5 millimeters long.

The prism is manufactured by moulding all the elements integrally from plastics material.

In each vertical strip, all the elements forming that strip have the same vertical angle, that is the angles in the vertical planes between the front and the rear surfaces 19 and 20 of the elements. Each element forming a vertical strip also has the same horizontal angle although this angle varies from strip to strip. For example, a strip in the center of the prism has each of its elements with front and rear surfaces, which are parallel in a horizontal plane. The next adjacent strips at each side of this center strip have their individual elements formed with the horizontal angles of the front and rear faces at a small angle. The horizontal angle between the front and rear faces of the strips increases incrementally for each strip compared to the previous strip going outwardly from the center strip. Furthermore, each element has its thicker side presented towards the center strip.

The geometry of the prism described above produces an image of objects at the rear of the vehicle, which is composed of vertical strips each of which slightly overlaps the next so that the horizontal field of view is extended for a given length of prism but the distance of the image from the driver of the vehicle remains unchanged.

The plane mirror 17 allows the driver to view the image produced by the prism.

The system thus provides a wide horizontal field of view of objects at the rear of the vehicle and this field of view is unobstructed by the body-work of the vehicle.

A transparent cover may be fitted over the rear of the housing 14 to prevent damage to the prism 16. The rear edge 21 of the housing may shroud this cover so as to protect it from accumulation of dirt and rain which could obscure the view through the system.

It is to be understood that the invention is not limited to the exact construction illustrated and described above, but that various changes and modifications may be made without departing from the spirit and scope of the invention defined by the following claims.

I claim:
1. A rear viewing system for a motor vehicle in which:
   a. a prism is positioned to deflect light from objects to the rear of a vehicle through an aperture in the vehicle roof onto a mirror positioned in front of a driver of the vehicle;
   b. the prism extends transversely of the vehicle and has vertical strips;
   c. the front and rear faces of an inner vertical strip are substantially parallel in a horizontal plane;
   d. the horizontal angles between the front and rear faces of the strips increase incrementally for each strip compared to the previous strip going outwardly from the inner strip; and
   e. each strip has its thicker side towards the inner strip so that the images formed by the different vertical strips of the prism are more closely spaced than the corresponding portions of the object thereby increasing the horizontal field of view for a given size of prism.

2. A rear viewing system as claimed in claim 1 in which each vertical strip of the prism is divided into similar elements each having the same vertical angle, the same horizontal angle and substantially the same thickness.

3. A rear viewing system as claimed in claim 2 in which the prism elements are each approximately 5 millimeters high and 5 millimeters long.

4. A rear viewing system as claimed in claim 1 in which the prism elements are each approximately 5 millimeters high and 5 millimeters long.

* * * * *